United States Patent Office 3,819,597
Patented June 25, 1974

3,819,597
POLYMERIZATION OF VINYL AROMATIC MONOMERS IN AQUEOUS SUSPENSION
Colin Temple Richards, Old Windsor, England, assignor to BP Chemicals Limited, London, England
No Drawing. Filed Nov. 30, 1971, Ser. No. 203,438
Claims priority, application Great Britain, Dec. 3, 1970, 57,466/70
Int. Cl. C08f *1/11, 7/04*
U.S. Cl. 260—93.5 W    11 Claims

ABSTRACT OF THE DISCLOSURE

Large polyvinyl aromatic beads are produced by polymerising in slush until a proportion of the monomer is polymerised, then dispersing the organic phase in water by adding a surfactant and an alkali metal orthophosphate and precipitating an inorganic phosphate suspending agent. The polymerisation is continued in suspension.

---

This invention relates to the production of polyvinyl aromatic polymer beads by the polymerisation of vinyl aromatic compounds in the absence of reinforcing agents such as rubber.

Processes for the polymerisation of vinyl aromatic compounds as stable aqueous suspensions are known. Such processes generally employ suspending agents to maintain the stability of the dispersed phase and prevent its agglomeration as polymerisation proceeds. It is also customary to employ monomer soluble free radical initiators. The polymer is produced as very fine beads which normally have a particle size of the order of 0.25 to 0.5 mm.

In such a suspension process the product particle size can be controlled by varying the agitator speed, suspending agent concentration and the concentration of surfactant extender which is usually present when an inorganic suspending agent is used. While it is conveniently possible to reduce the particle size by changing any of these variables, there is a maximum particle size that may be achieved with any system and when this is exceeded irreproducability and suspension instability result. Accordingly attemps to increase the particle size by controlling these variables runs the risk of unstable operation.

It is often desirable to produce large beads in the size range 0.5–5 mm. for particular end uses, as for example conversion to expandable polystyrene beads by steeping in a blowing agent.

It is an object of the present invention to improve control of particle size in the suspension polymerisation of polyvinyl aromatic polymer beads.

Accordingly the present invention is a process for the polymerisation of a vinyl aromatic monomer under non-suspension conditions which comprises in a first stage polymerising the vinyl aromatic monomer in the absence of rubber until a conversion of the monomer in the range 10 to 80% has been reached and in a second stage dispersing the solution of polymer in monomer so produced in water in the presence of a surfactant and an alkali metal orthophosphate, precipitating on insoluble inorganic phosphate suspending agent and continuing the polymerisation under suspension polymerisation conditions.

Any suitable vinyl aromatic monomer may be used but the preferred monomer is styrene.

First stage polymerisation may take place under conventional non-suspension conditions for the polymerisation of vinyl aromatic monomers, preferably using temperatures in the range 80–150° C. and one or more free radical initiators.

As polymer is formed the polymerisation mix becomes more and more viscous and it is found that when about 40% conversion has been reached it is difficult to suspend the mixture in water using a conventional insoluble inorganic phosphate suspending agent. Using the dispersion and suspension step of the present invention allows the polymerisation mixture to be easily suspended up to at least 80% conversion. Thus a preferred operation is one where the first stage polymerisation is continued until a conversion in the range 40 to 80% is reached.

Suitably from 50–300, preferably 80–120 parts water (all parts expressed as parts by weight per hundred parts of monomer), are present during the first stage polymerisation. Regulating the amount of polymerisation in the first stage allows for control of the product bead size, for the greater the conversion to polymer in the first stage the larger the bead size if all other factors are kept constant. This allows bead size to be increased while retaining a stable suspension system.

After the first stage polymerisation the solution of polymer in monomer so produced is dispersed in water, preferably in situ in the water present in the first stage polymerisation suitably by mechanical agitation in the presence of the surfactant and alkali metal orthophosphate.

Any surfactant conventionally employed as an extender for inorganic phosphate suspending agents may be used. Preferred surfactants are the anionic surfactants. Examples are sodium alkyl phosphates such as sodium nonyl phosphate and sodium alkyl aryl sulphonates such as sodium dodecyl benzene sulphonate.

The preferred trialkali metal orthophosphate is trisodium orthophosphate.

The quantity of surfactant and orthophosphate employed must be at least sufficient to allow the mechanical agitation used to break the first stage product into suspension sized droplets. Preferably, 0.0005 to 0.5, most preferably 0.005 to 0.05 parts of surfactant and 0.1 to 2, preferably, 0.25 to 1.0 parts orthophosphate are used per hundred parts of monomer.

When the first stage polymer solution has been broken down into suspension sized droplets the substantially insoluble inorganic phosphate suspending agent is precipitated. This may be conveniently carried out by adding a water soluble salt of a metal whose phosphate is a suspending agent. The state of division of the phosphate suspending agent is suitably controlled by adjusting the pH value of the aqueous phase during precipitation.

A preferred phosphate suspending agent is finely divided calcium hydroxy apatite which may be prepared by adding disodium hydrogen phosphate and precipitating the hydroxy apatite with a soluble calcium salt such as calcium chloride or calcium nitrate. More preformed suspending agent may be added if desired. The total quantity of suspending agent present is preferably kept as low as possible consistent with stability and is suitably in the range 0.1 to 0.5 parts. Such concentrations of suspending agent if added initially would result in extremely fine polymer beads.

Polymerisation may be completed under conventional conditions for the suspension polymerisation of vinyl aromatic polymers i.e. polymerisation temperatures up to 150° C. preferably with one or more free radical polymerisation initiators. These may be the initiators of the first stage polymerisation or, if necessary, more initiators may be added.

The invention is illustrated by the following examples.

EXAMPLE 1

Stage 1

Styrene 27.5 kg. was polymerised in the presence of demineralised water 22.5 kg. and benzoyl peroxide (75 percent) 47.6 g. for 1.75 hours at 90° C., to a conversion of ca. 25 percent.

Stage 2

| | G. |
|---|---|
| Sodium nonyl phosphate (1.0 percent aqueous solution) | 275 |
| Trisodium orthophosphate dodecahydrate | 184 |
| Disodium hydrogen orthophosphate dodecahydrate | 118 |
| Calcium chloride dihydrate | 170.5 |
| Stearic acid | 27.5 |
| t-Butyl perbenzoate | 36 | were added sequentially.

Agitator speed was maintained at 240 r.p.m. throughout.

After suspension, the temperature was raised to 135° C. over 3.5 hours using the following cycle: 90° C. to 115° C./½ hour; 115° to 135° C./3 hours.

The suspension was then cooled to 90° C., the slurry acidified to pH 2 with concentrated hydrochloric acid, the beads filtered off and washed with demineralised water and dried.

The polymer beads had the following size distribution:

BS 60 mesh (0.25 mm.) 50.5%, BS 85 mesh (0.175 mm.) 8.5%,
BS 100 mesh (0.15 mm.) 4.5%, smaller than BS 100 mesh 36.5%.

EXAMPLE 2

Example 1 was repeated, except that the polymerisation at 90° C. in the 1st stage was extended to 2 hours, 20 minutes and the benzoyl peroxide weight increased to 95.2 g. The conversion at suspension was ca. 55 percent.

The polymer beads produced had the following size distribution:

BS 10 mesh (1.7 mm.) 0.5%, BS 22 mesh (0.7 mm.) 32.5%,
BS 30 mesh (0.5 mm.) 50.5%, BS 44 mesh (0.35 mm.) 12.5%,
BS 60 mesh (0.25 mm.) 2.5%, BS 85 mesh (0.175 mm.) 1.5%.

EXAMPLE 3

Example 2 was repeated, with the exception that the polymerisation at 90° C. in the 1st stage was extended to 3 hours, 40 mins. The conversion at suspension was ca. 75 percent.

The polymer beads produced had the following size distribution:

BS 10 mesh (1.7 mm.) 2.5%, BS 22 mesh (0.7 mm.) 68%,
BS 30 mesh (0.5 mm.) 16%, BS 44 mesh (0.35 mm.) 6.5%,
BS 60 mesh (0.25 mm.), 3%, BS 85 mesh (0.175 mm.) 4%.

The examples show that as the conversion at suspension is increased, so the final product bead size is increased, everything else being constant.

I claim:

1. In a process for the homopolymerization of a vinyl aromatic monomer the steps of polymerizing the monomer in a first stage in the presence of water under nonsuspension conditions to a conversion in the range of from 10 to 80% by weight, dispersing the solution of polymer in monomer so formed in water by agitation in the presence of a surfactant and a trialkali metal orthophosphate, precipitating an insoluble inorganic phosphate suspending agent, continuing the polymerization in aqueous suspension and recovering the polymer.

2. A process according to claim 1 wherein the monomer is styrene.

3. A process according to claim 1 where both stages of polymerisation are carried out in the presence of one or more free radical initiators.

4. A process according to claim 1 where the first stage polymerisation is continued to a conversion in the range 40 to 80%.

5. A process according to claim 1 where the surfactant is an anionic surfactant.

6. A process according to claim 1 where the surfactant is sodium nonyl phosphate or sodium dodecyl benzene sulphonate.

7. A process according to claim 1 where the trialkali metal orthophosphate is trisodium orthophosphate.

8. A process according to claim 1 where from 0.0005 to 0.5 parts surfactant and from 0.1 to 2 parts orthophosphate are used per hundred parts wt. monomer.

9. A process according to claim 1 where the suspending agent is finely divided calcium hydroxy apatite.

10. A process according to claim 1 where from 0.1 to 0.5 parts suspending agent are used.

11. In a process for the polymerization of styrene, the steps of polymerizing the monomer in a first-stage in the presence of water under nonsuspension conditions to a conversion in the range of 10 to 80% by weight, agitating the solution of the polymer in monomer so formed in a mixture which consists essentially of water, an anionic surfactant and a trialkali metal orthophosphate to form a dispersion, precipitating an insoluble inorganic phosphate suspending agent, continuing the polymerization in aqueous suspension and recovering the polymer.

References Cited
UNITED STATES PATENTS

| | | | |
|---|---|---|---|
| 2,566,567 | 9/1951 | Hutchinson | 260—93.5 W |
| 3,047,534 | 7/1962 | Dyer et al. | 260—880 R |
| 3,068,192 | 12/1962 | White | 260—93.5 W |

JAMES A. SEIDLECK, Primary Examiner

U.S. Cl. X.R.

260—95 R